US009996606B2

(12) United States Patent
Fukuda

(10) Patent No.: US 9,996,606 B2
(45) Date of Patent: Jun. 12, 2018

(54) METHOD FOR DETERMINING CONDITION OF CATEGORY DIVISION OF KEY PERFORMANCE INDICATOR, AND COMPUTER AND COMPUTER PROGRAM THEREFOR

(71) Applicant: INTERNATIONAL BUSINESS MACHINES CORPORATION, Armonk, NY (US)

(72) Inventor: Mari Abe Fukuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 14/924,773

(22) Filed: Oct. 28, 2015

(65) Prior Publication Data
US 2016/0154874 A1 Jun. 2, 2016

(30) Foreign Application Priority Data
Nov. 28, 2014 (JP) ................................. 2014-240691

(51) Int. Cl.
*G06F 17/30* (2006.01)
*G06Q 10/06* (2012.01)

(52) U.S. Cl.
CPC .. *G06F 17/30598* (2013.01); *G06F 17/30958* (2013.01); *G06Q 10/06393* (2013.01)

(58) Field of Classification Search
CPC ........ G06F 17/30598; G06F 17/30958; G06Q 10/06393
See application file for complete search history.

(56) References Cited

U.S. PATENT DOCUMENTS 8,583,466 B2 * 11/2013 Margulies .............. G06Q 10/06
705/7.26
8,880,591 B2 * 11/2014 Feldman ................ G06Q 10/06
709/203

(Continued)

FOREIGN PATENT DOCUMENTS

JP 2000250967 A 9/2000
JP 2005174329 A 6/2005

(Continued)

OTHER PUBLICATIONS

Stack Overflow Community, "Algorithm—Edit Distance Between Two Graphs—Stack Overflow", http://stackoverflow.com/questions/16399597/edit-distance-between-two-graphs, Apr. 28, 2017, pp. 1-2.*

(Continued)

*Primary Examiner* — Cheryl Lewis
(74) *Attorney, Agent, or Firm* — Jared L. Montanaro

(57) ABSTRACT

Embodiments include determining a condition of category division of a key performance indicator. Aspects include dividing multiple pieces of workflow execution information into a division number for the type of the key performance indicator and generating a graph for each of the multiple groups after the division, from workflow execution information belonging to the group. Aspects also include calculating graph edit distances for respective two arbitrary graphs and generating a new group by merging two graphs having the shortest graph edit distance. Aspects further include calculating a graph edit distance for the new group and repeating the generation of the new group and the calculation of the graph edit distance for the new group, until the graph edit distance is equal to or more than a certain fixed edit distance.

19 Claims, 13 Drawing Sheets

| Type m of KPI | Division number K |
|---|---|
|  | 10 |
| Workflow start condition 1 | 2 |
| Number of times of viewing of a particular page during workflow execution | 5 |
| Rate of time spent on a particular task process relative to workflow execution time | 10 |
| Time spent from a particular task to a particular task during workflow execution | 5 |
| Attribute (product name) relevant to workflow execution | 30 |
| Attribute relevant to workflow executioner | 30 |

(56) References Cited

U.S. PATENT DOCUMENTS

| | | | | |
|---|---|---|---|---|
| 9,436,922 | B2* | 9/2016 | Agarwal | G06Q 10/06 |
| 2002/0087679 | A1 | 7/2002 | Pulley et al. | |
| 2007/0055564 | A1* | 3/2007 | Fourman | G06Q 10/10 705/7.39 |
| 2009/0064025 | A1* | 3/2009 | Christ | G06Q 10/10 715/772 |
| 2012/0254291 | A1* | 10/2012 | Feldman | G06Q 10/06 709/203 |
| 2013/0132108 | A1* | 5/2013 | Solilov | G06Q 10/06 705/2 |
| 2014/0095543 | A1* | 4/2014 | Hsiao | G06F 17/30442 707/779 |
| 2014/0310198 | A1* | 10/2014 | Wamberg | G06Q 10/10 705/345 |
| 2014/0350994 | A1* | 11/2014 | Lakshmanan | G06Q 10/06311 705/7.26 |
| 2015/0112700 | A1* | 4/2015 | Sublett | G06Q 10/06393 705/2 |
| 2016/0155078 | A1 | 6/2016 | Fukuda et al. | |

FOREIGN PATENT DOCUMENTS

| | | |
|---|---|---|
| JP | 2007529048 A | 10/2007 |
| JP | 2008059368 A | 3/2008 |
| JP | 2008129810 A | 6/2008 |
| JP | 2011059962 A | 3/2011 |
| JP | 2013109762 A | 6/2013 |
| JP | 2014157605 A | 8/2014 |
| JP | 6029119 B2 | 11/2016 |
| WO | 2007132547 A1 | 11/2007 |
| WO | 2008018132 A1 | 2/2008 |

OTHER PUBLICATIONS

Zhiping Zeng, Anthony K.H. Tung, Jianyong Wang, Jianhua Feng, and Lizhu Ahou, "Comparing Stars: On Approximating Graph Edit Distance", VLDB '09, Aug. 24-28, 2009, ACM, pp. 25-36.*

Xinbo Gao, Bing Xiao, Dacheng Tao, and Xuelong Li, "A Survey of Graph Edit Distance", Springer-Verlag London Limited 2009, pp. 113-129.*

Abe et. Al., "Business Monitoring Framework for Process Discovery with Real-Life Logs", Business Process Management, Lecture Notes in Computer Science, vol. 8659, 2014; pp. 416-423.

Kamishima, Toshihiro , "Data Mining", [searched on Oct. 15, Heisei 26], [online], available from Internet <http://www.kamishima.net/archive/datamining.pdf; 48 pgs.

Unknown Author "MCL—a cluster algorithm for graphs", [searched on Oct. 15, Heisei 26], [online], available from <http://micans.org/mcl/; dated Oct. 15, 2014; 1 pg.

van der Aalst, Wil M., "Process Mining: Discovery, Conformance and Enhancement of Business Processes", Springer, 2011; p. 162-164.

List of IBM Patents or Patent Applictions Treated As Related; (Appendix P), Filed Feb. 1, 2016, 2 pages.

Mari Abe Fukuda et al., Pending U.S. Appl. No. 14/969,269 entitled "Method for Determining Condition of Category Division of Key Performance Indicator, and Computer and Computer Program Therefor ," filed in the USPTO on Dec. 15, 2015.

Notification of Reasons for Refusal, Japan Application No. 2014-240691, dated Apr. 22, 2016, 2 pgs.

Written Argument, Japan Application No. 2014-240691, updated Oct. 17, 2016, translated Nov. 23, 106, 3 pgs.

Decision to Grant a Patent, Japan Application No. 2014-240691, dated Sep. 6, 2016, 6 pgs.

Kudo, M., "Operational Work Pattern Discovery Based on Human Behavior Analysis," 2014 SRII Global Conference, pp. 90-97, © 2014 IEEE.

Liu et al., "Business Artifact-Centric Modeling for Real-Time Performance Monitoring," BPM 2011, LNCS 6896, pp. 265-280, 2011, © Springer-Verlag Berlin Heidelberg.

IBM, "IBM WebSphere Business Monitor Information Center," http://pic.dhe.ibm.com/infocenter/dmndhelp/v7r0mx/indexjsp?topic=%2Fcom.ibm.btools.help.monitor.doc%2Fhome%2Fhome.html, printed Dec. 2, 2016, 2 pgs.

Abe et al., "Analyzing Business Processes by Automatically Detecting KPI Thresholds," 2016 IEEE International Conference on Services Computing, pp. 187-191, © 2016 IEEE.

Fernandez et al., "A graph distance metric combining maximum common subgraph and minimum common supergraph," Pattern Recognition Letters, vol. 22, Iss. 6-7, pp. 753-758, May 2001.

* cited by examiner

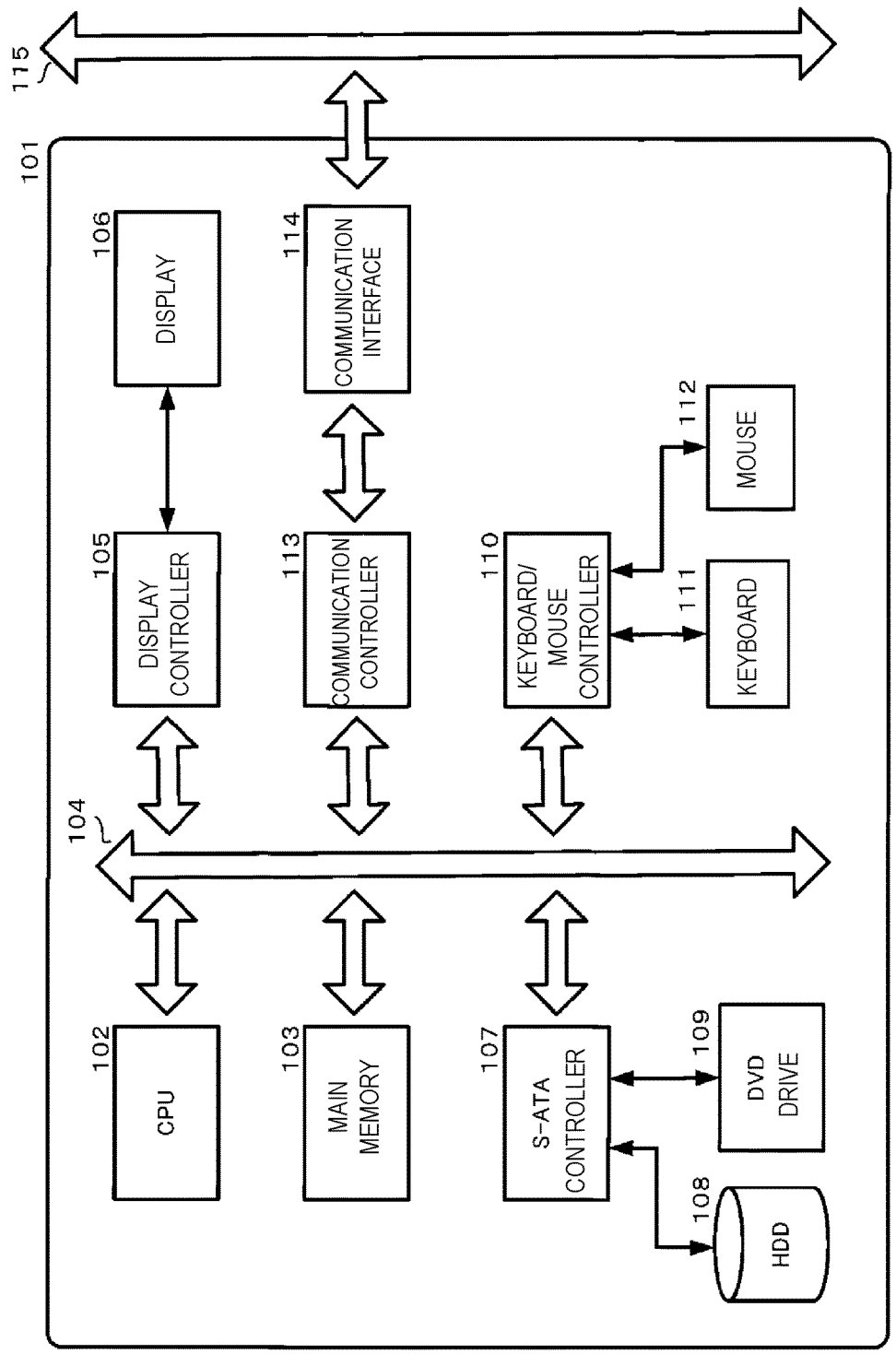
[FIGURE 1A]

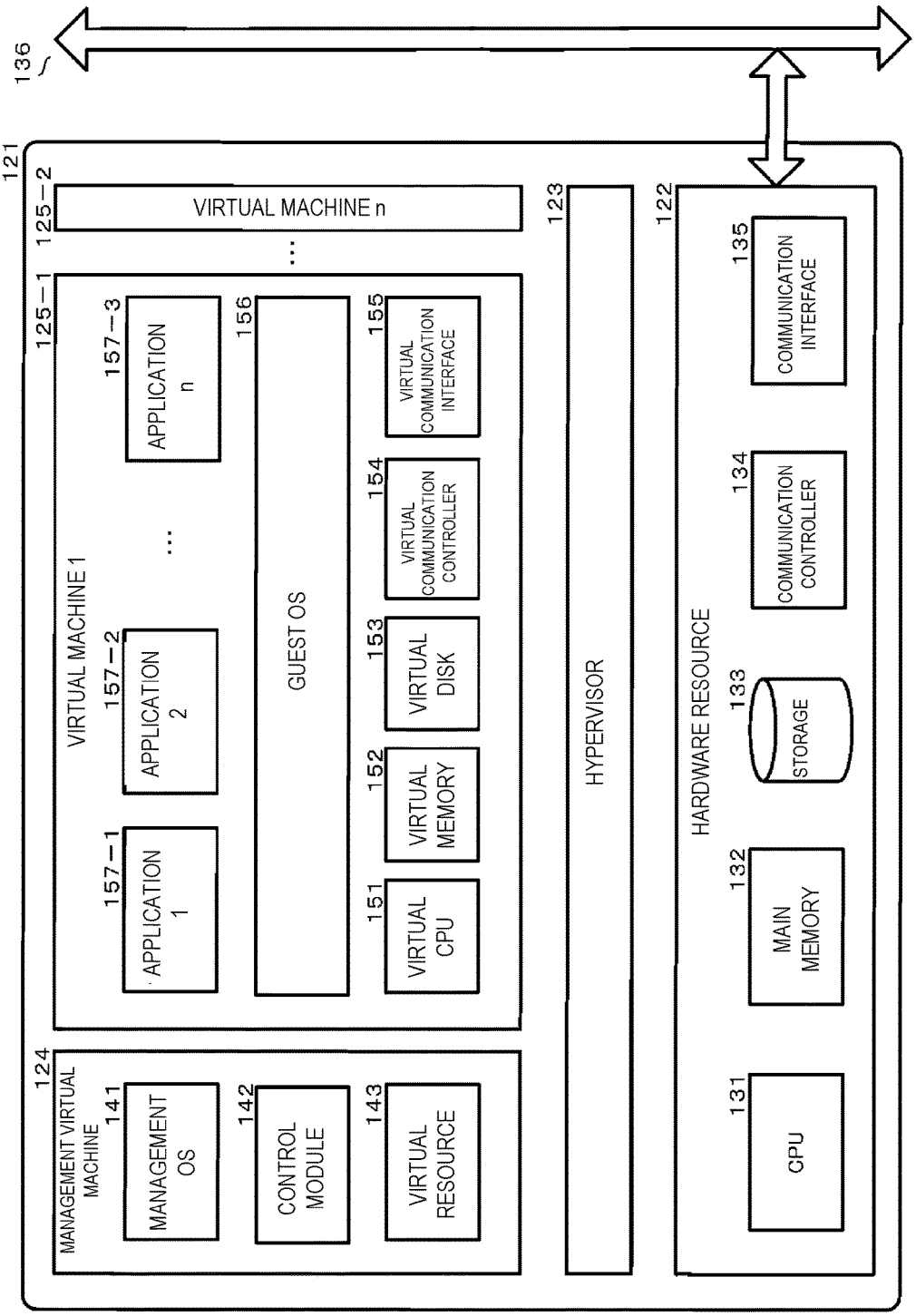

[Figure 2A]
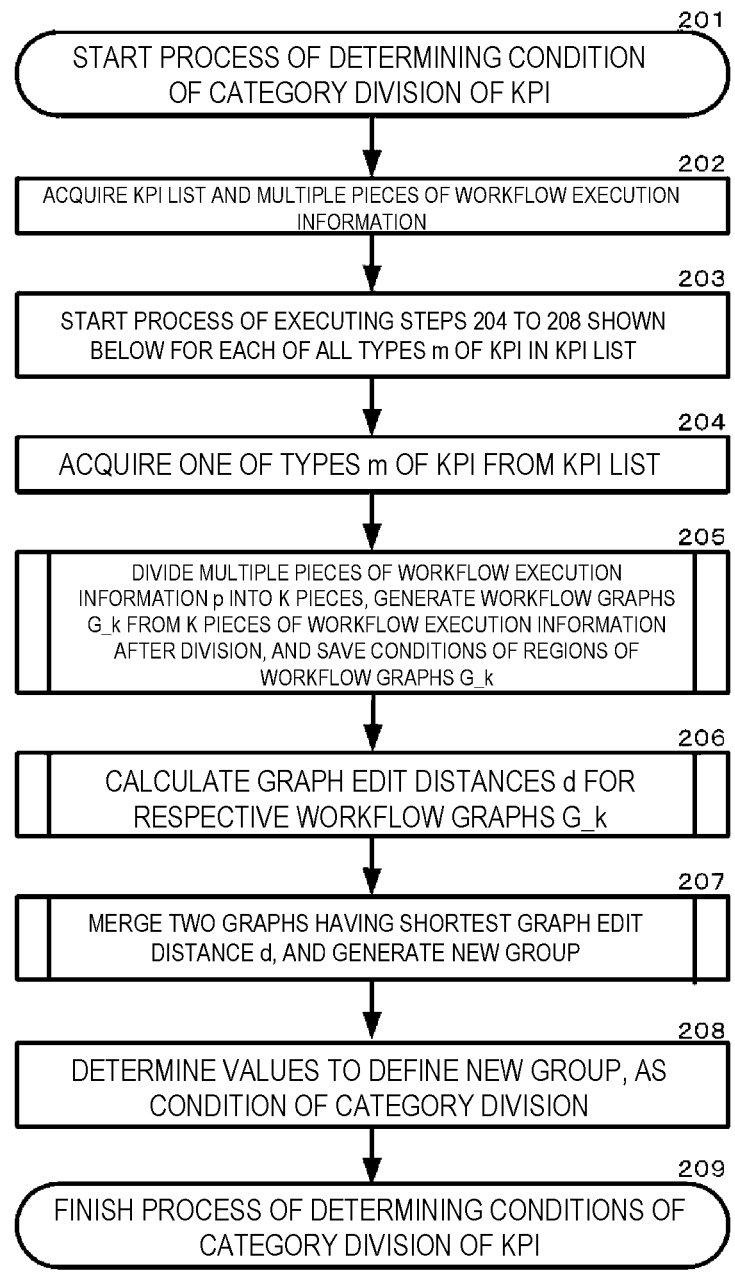

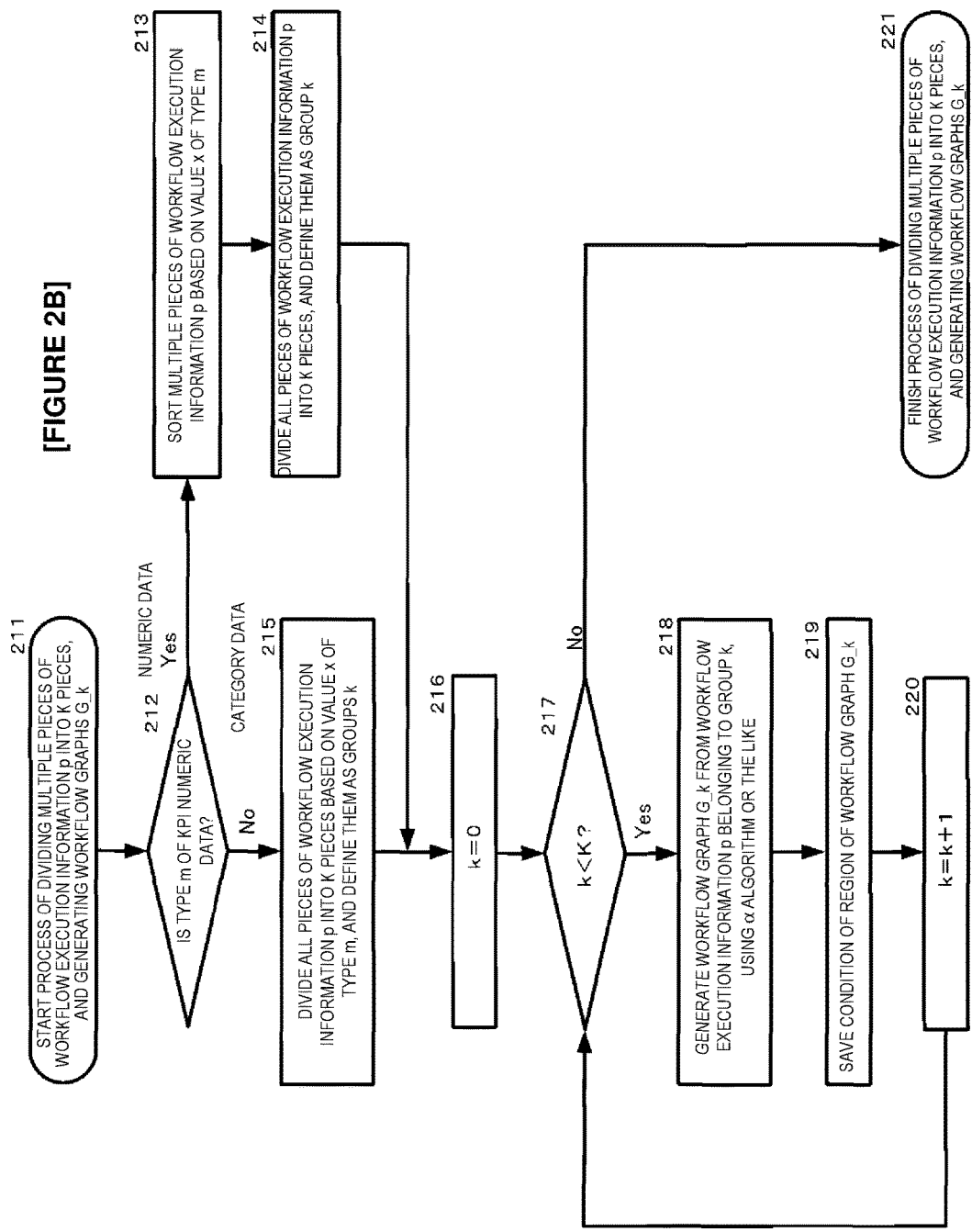

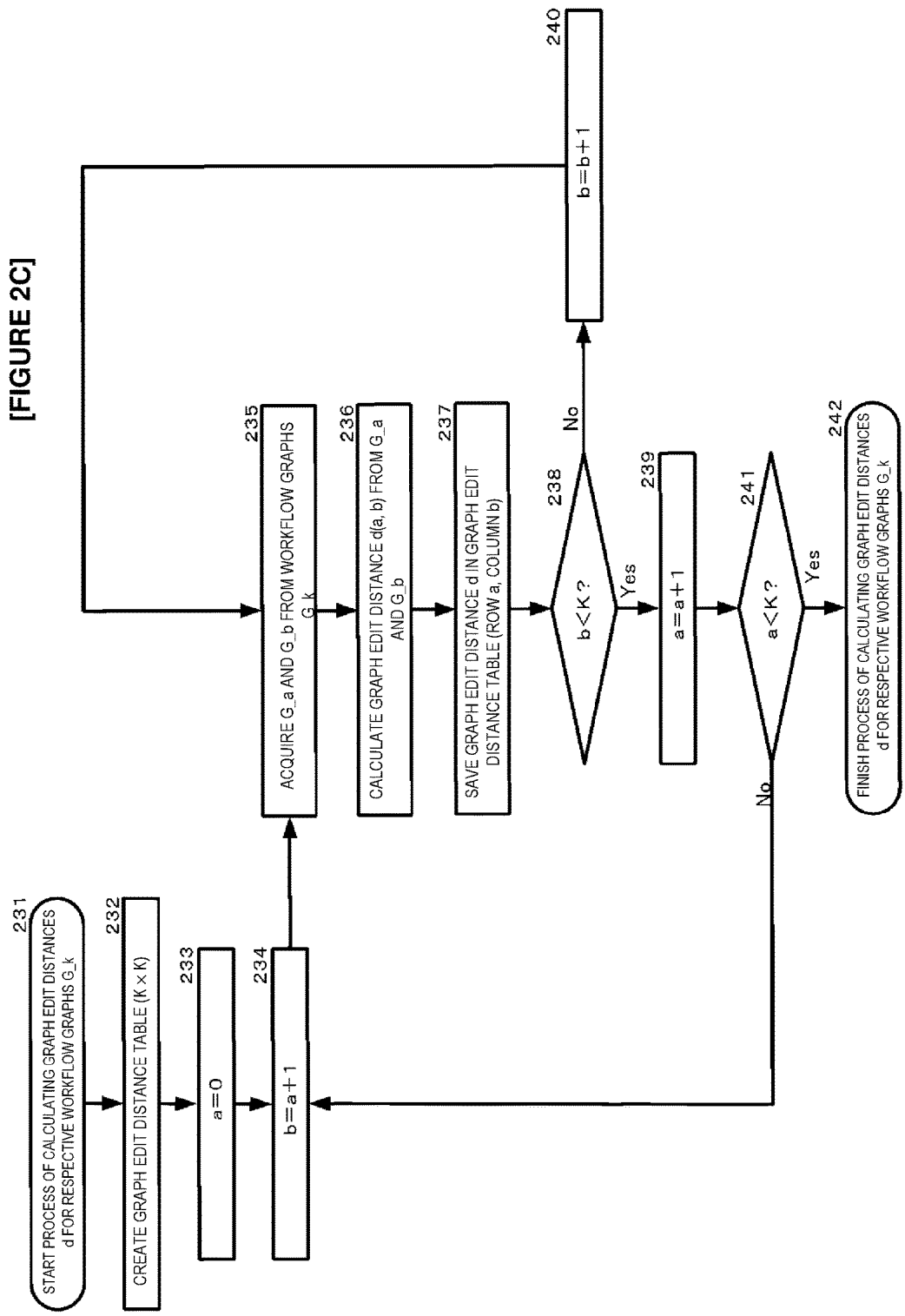

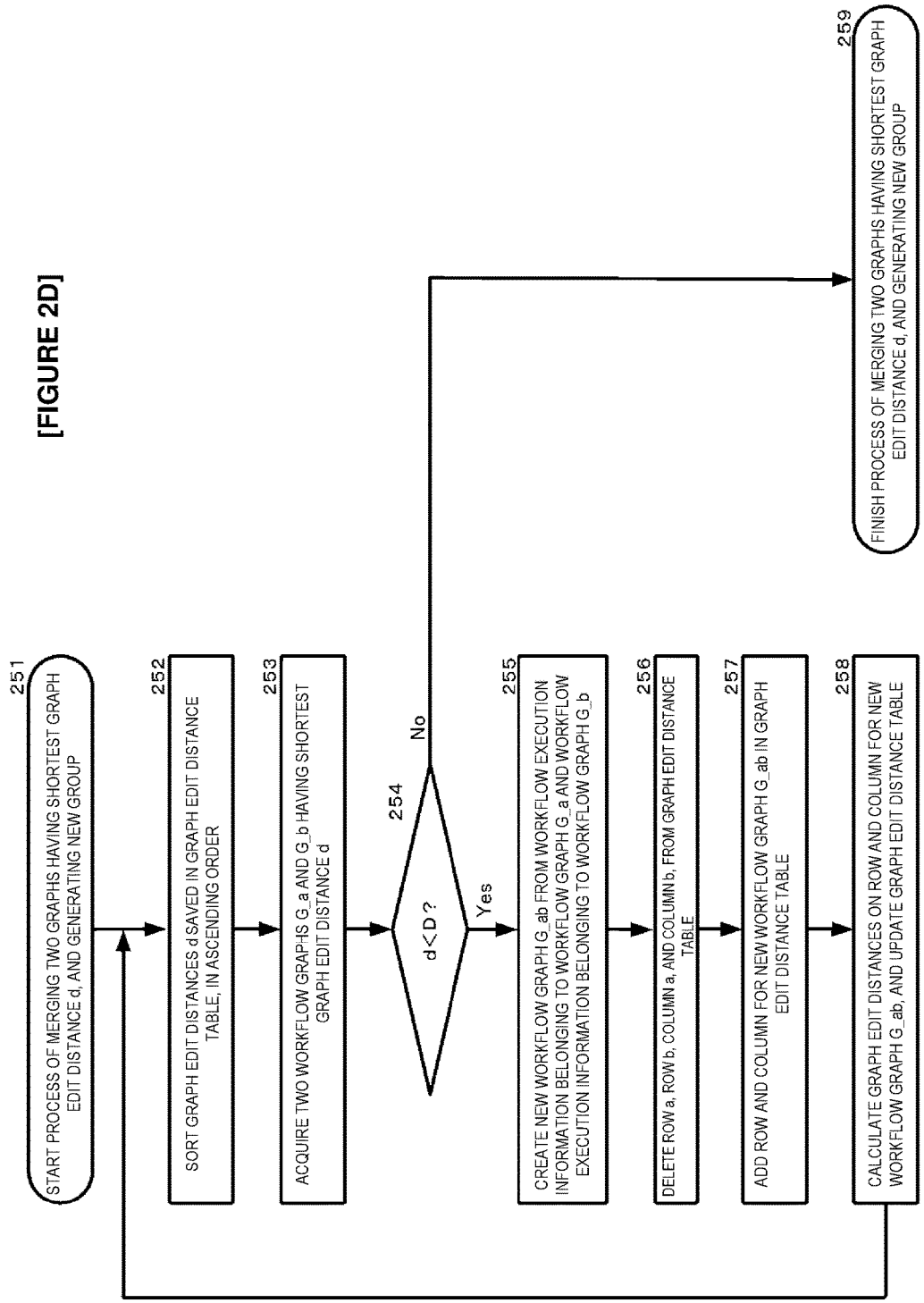

| Type m of KPI | Division number K |
|---|---|
| Workflow start condition 1 | 10 |
| Number of times of viewing of a particular page during workflow execution | 2 |
| Rate of time spent on a particular task process relative to workflow execution time | 5 |
| Time spent from a particular task to a particular task during workflow execution | 10 |
| Attribute (product name) relevant to workflow execution | 5 |
| Attribute relevant to workflow executioner | 30 |
|  | 30 |

```
01  <?xml version="1.0" encoding="UTF-8"?>
02  <WorkflowLog>
03    <Process>
04      <ProcessInstance id="0">
05      <!-- DURATION=314001 -->
06      <!-- START_TYPE=new -->
07      <!-- HELP_PAGE_ACCESS=0 -->
08        <AuditTrailEntry>
09          <WorkflowModelElement>logon_page</WorkflowModelElement>
10          <EventType>Complete</EventType>
11          <TimeStamp>2013-01-01T08:30:33.408+0900</TimeStamp>
12          <Originator>user1</Originator></AuditTrailEntry>
13        <AuditTrailEntry>
14          <WorkflowModelElement>welcome_page</WorkflowModelElement>
15          <EventType>Complete</EventType>
16          <TimeStamp>2013-01-01T08:30:34.752+0900</TimeStamp>
17          <Originator>user1</Originator></AuditTrailEntry>...</ProcessInstance>
18      <ProcessInstance id="4">
19      <!-- DURATION=363491 -->
20      <!-- START_TYPE=update -->
21      <!-- HELP_PAGE_ACCESS=1 -->
22        <AuditTrailEntry>
23          <WorkflowModelElement>logon_page</WorkflowModelElement>
24          <EventType>Complete</EventType>
25          <TimeStamp>2013-01-01T08:30:48.857+0900</TimeStamp>
26          <Originator>user2</Originator></AuditTrailEntry>
27        <AuditTrailEntry>
28          <WorkflowModelElement>logon_failure</WorkflowModelElement>
29          <EventType>Complete</EventType>
30          <TimeStamp>2013-01-01T08:30:49.938+0900</TimeStamp>
31          <Originator>user2</Originator></AuditTrailEntry>...</ProcessInstance>
32    </Process>
33  </WorkflowLog>
```

[FIGURE 3B]

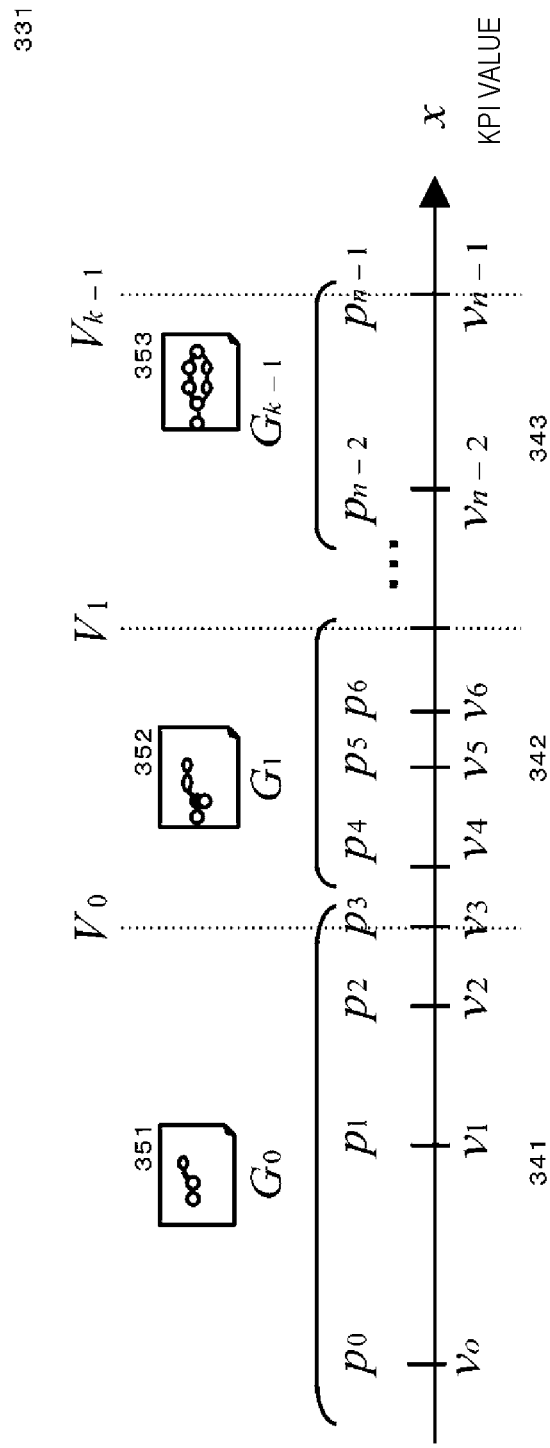
[FIGURE 3C]

$G_0: 0 < x \leq V_0$ $G_1: V_0 < x \leq V_1$ $G_2: V_1 < x \leq V_2$

...

$G_{k-1}: V_{(n-1)-\frac{n}{k}} < x \leq V_{n-1}$

[FIGURE 3D]

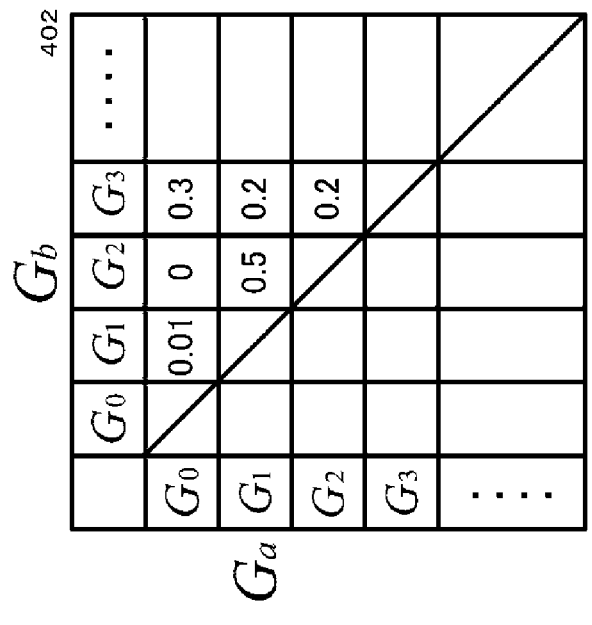
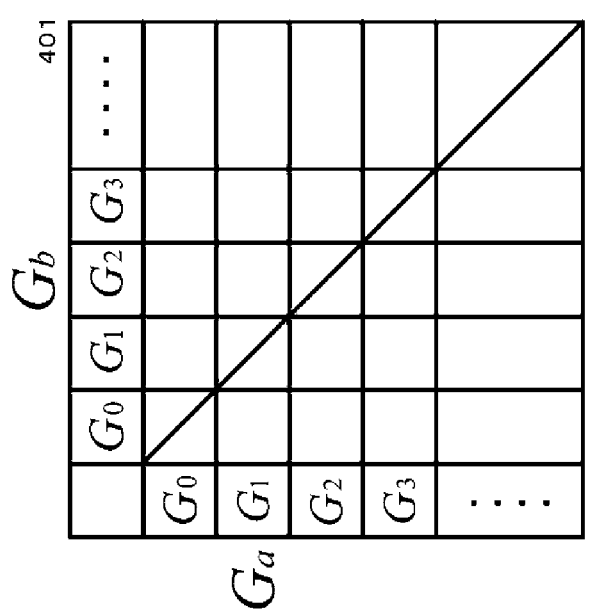
[FIGURE 4]

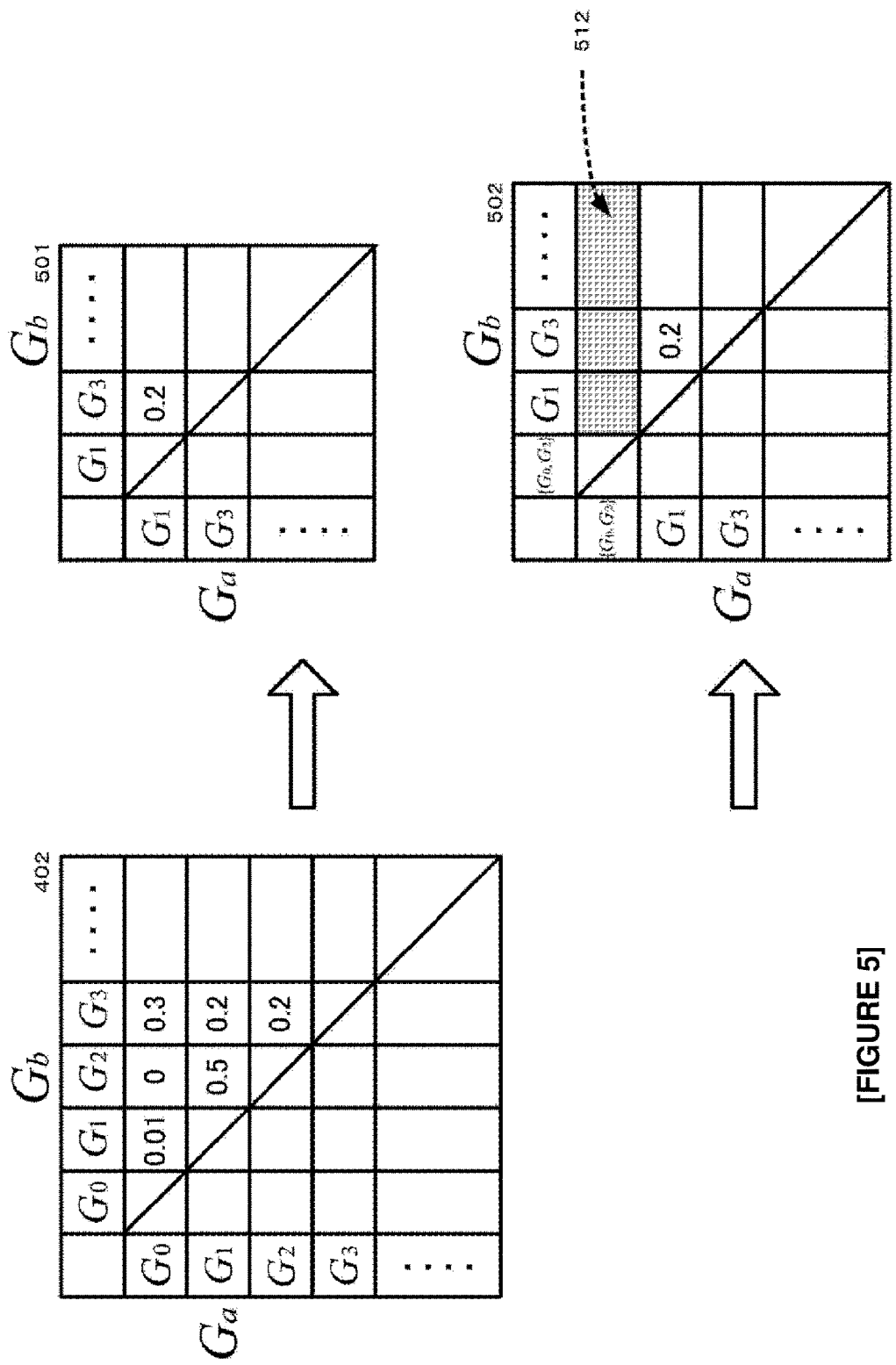
[FIGURE 5]

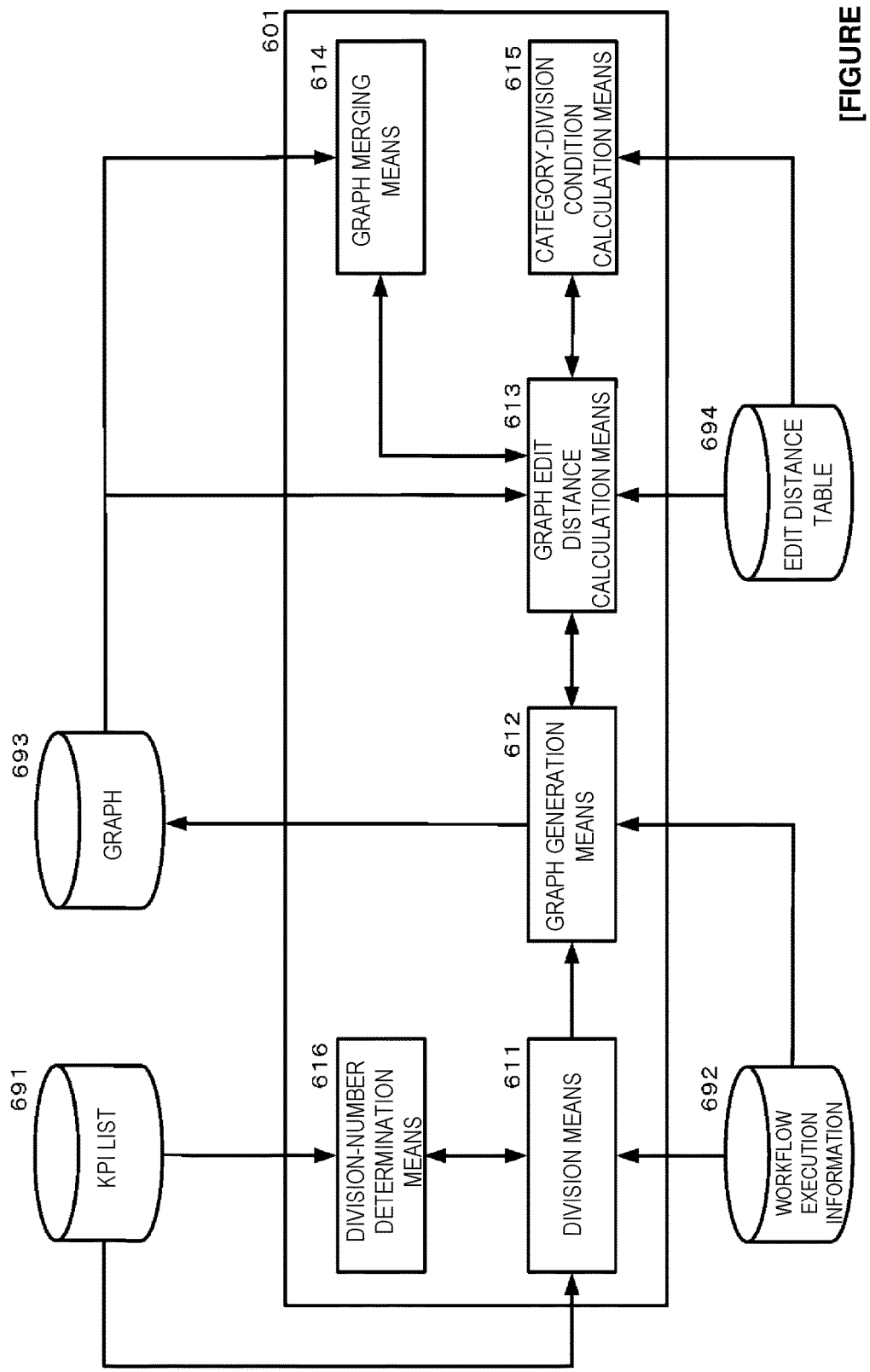

METHOD FOR DETERMINING CONDITION OF CATEGORY DIVISION OF KEY PERFORMANCE INDICATOR, AND COMPUTER AND COMPUTER PROGRAM THEREFOR

FOREIGN PRIORITY

This application claims priority to Japanese Patent Application No. 2014-240691 filed Nov. 28, 2014; and all the benefits accruing therefrom under 35 U.S.C. § 119, the contents of which in its entirety are herein incorporated by reference.

BACKGROUND

The present invention relates to a technique for determining the condition of the category division of key performance indicators (hereinafter, also referred to as "KPIs").

A process discovery is a technology for grasping the actual state of a business process, by automatically creating workflows (for example, business process modeling notation: BPMN) of a business from logs (for example, the execution information of the process) of a business system, and extracting the characteristic of the process from various standpoints. In the process discovery, as the quantity of logs increases, the extracted workflows are complicated (a so-called spaghetti process), resulting in the difficulty of the analysis of the workflows. Hence, it is important how to narrow the spaghetti process down to the information amount allowing a person to understand.

SUMMARY

Embodiments include a method for determining a condition of category division of a key performance indicator (KPI) from multiple pieces of workflow execution information, each of the multiple pieces of workflow execution information having at least one set of a type of the KPI and a value associated with the type. The method, executed by a computer, includes (a) dividing the multiple pieces of workflow execution information into a division number for the type of the KPI and (b) generating a graph for each of the multiple groups after the division into the division number, from workflow execution information belonging to the group. The method also includes (c) calculating graph edit distances for respective two arbitrary graphs, (d) generating a new group by merging two graphs having the shortest graph edit distance and (e) calculating a graph edit distance for the new group. The method also includes (f) repeating the steps (d) to (e) until the graph edit distance is equal to or more than a certain fixed edit distance, and determining a value to define the new group, as the condition of the category division.

Embodiments include a computer for determining a condition of category division of a key performance indicator (hereinafter, referred to as a KPI) from multiple pieces of workflow execution information, each of the multiple pieces of workflow execution information having at least one set of a type of the KPI and a value associated with the type. The computer includes division means for dividing the multiple pieces of workflow execution information into a division number for the type of the KPI, graph generation means for generating a graph for each of the multiple groups after the division into the division number, from workflow execution information belonging to the group, and graph edit distance calculation means for calculating graph edit distances for respective two arbitrary graphs. The computer also includes graph merging means for generating a new group by merging two graphs having the shortest graph edit distance, wherein the graph edit distance calculation means further calculates a graph edit distance between the new group and another graph. The generation of the new group and the calculation of the graph edit distance for the new group are repeatedly performed until the graph edit distance is equal to or more than a certain fixed edit distance and a value to define the new group is determined as the condition of the category division.

Embodiments also include a computer program product for determining a condition of category division of a key performance indicator (hereinafter, referred to as a KPI) from multiple pieces of workflow execution information, each of the multiple pieces of workflow execution information having at least one set of a type of the KPI and a value associated with the type, the computer program product causing a computer to execute the steps of the method. The method includes (a) dividing the multiple pieces of workflow execution information into a division number for the type of the KPI and (b) generating a graph for each of the multiple groups after the division into the division number, from workflow execution information belonging to the group. The method also includes (c) calculating graph edit distances for respective two arbitrary graphs, (d) generating a new group by merging two graphs having the shortest graph edit distance and (e) calculating a graph edit distance for the new group. The method also includes (f) repeating the steps (d) to (e) until the graph edit distance is equal to or more than a certain fixed edit distance, and determining a value to define the new group, as the condition of the category division.

BRIEF DESCRIPTION OF DRAWINGS

Through the more detailed description of some embodiments of the present disclosure in the accompanying drawings, the above and other objects, features and advantages of the present disclosure will become more apparent, wherein:

FIG. 1A is a diagram showing an example of a computer that can be used in an embodiment of the present invention, or a computer according to the embodiment of the present invention;

FIG. 1B is a diagram showing an example of a computer that can be used in an embodiment of the present invention, or a computer according to the embodiment of the present invention, and showing the case where a single or multiple virtual machines operate on the computer;

FIG. 2A shows a flowchart for the process of determining the condition of the category division of a key performance indicator (KPI) from multiple pieces of workflow execution information according to an embodiment of the present invention;

FIG. 2B shows a flowchart for the process of dividing the multiple pieces of workflow execution information and generating workflow graphs in the flowchart shown in FIG. 2A;

FIG. 2C shows a flowchart for the process of calculating graph edit distances for the respective workflow graphs in the flowchart shown in FIG. 2A;

FIG. 2D shows a flowchart for the process of merging two graphs that have the shortest edit distance and generating a new group in the flowchart shown in FIG. 2A;

FIG. 3A shows an example of a KPI list that can be used in the embodiment of the present invention;

FIG. 3B shows an example of the workflow execution information that can be used in the embodiment of the present invention;

FIG. 3C shows an example of a workflow graph that can be generated in the embodiment of the present invention;

FIG. 3D shows an example of the conditions of the regions of workflow graphs that can be saved in the embodiment of the present invention;

FIG. 4 shows an example of a graph edit distance table that can be generated in the embodiment of the present invention;

FIG. 5 shows an example in which the graph edit distance table is updated, in the embodiment of the present invention; and FIG. 6 is a diagram showing an example of a functional block diagram of a computer that preferably include the hardware configuration according to FIG. 1A or FIG. 1B and that implements the embodiment of the present invention according to the flowcharts shown in FIG. 2A to FIG. 2D respectively.

DETAILED DESCRIPTION

Embodiments of the present invention will be described below, in accordance with the drawings. In the following drawings, unless otherwise mentioned, an identical reference numeral indicates an identical object. It should be understood that the embodiments of the present invention are embodiments for describing preferable aspects of the present invention and there is no intention of limiting the scope of the present invention to the disclosure herein.

In order to make a workflow easily understood when a person looks through it, the filtering of logs is necessary. As the filtering, for example, in the case of performing the filtering focusing on the type of a certain KPI such as the processing time of a workflow, the trial and error is necessary on what KPI threshold value should be selected. Except for KPIs in which the number of KPI types is small, the effort of the trial and error for selecting the threshold value is serious, and as shown in the following example 1 to example 3, it is unclear how to set the threshold value for changing the workflow, resulting in an obstacle of the analysis of the actual state of the business process.

EXAMPLE 1

Suppose the case of examining whether the processing time makes a difference in the pattern of the workflow, in order to reduce the processing time of the workflow and achieve the business improvement. Although two workflows of 10 minutes or more and 10 minutes or less were compared, the difference was not found. The threshold value was altered by trial and error, and as a result, a threshold value for which a significant change was actually recognized in the workflow was 20 minutes or more/less.

EXAMPLE 2

Suppose the case of knowing whether, when a certain business is performed, a significant difference in process appears depending on the relevant product. When the product has a few types, it is possible to compare the process by visual observation and perform the category division. However, as the type of the product increases, the category division becomes difficult.

EXAMPLE 3

Suppose the case of performing the comparison of the workflow according to the company entrance year, for example, such as the comparison between persons having early company entrance years and persons having late company entrance years, in order to decide the range of the application of an in-company training. However, it is difficult to determine what year changes the workflow.

Further, by setting a condition for workflow execution information, such as the limitation to logs that begin with a particular task, it is possible to simplify a workflow that is obtained thereafter by the synthesis from the workflow execution information (see Non Patent Literature 1). However, there is a problem in that it is necessary to find, by trial and error, the threshold value for filtering logs based on the KPI.

Further, the input in a general clustering method (the k-means method and the like) is an element that is expressed by an attribute vector (see Non Patent Literature 2). However, the workflow execution information (which is also an ordered task list) cannot be expressed by an attribute vector. Therefore, there is a problem in that the general clustering method cannot be applied to the workflow execution information.

Further, the input in a graph clustering method (for example, the Markov Cluster Algorithm) is a graph, and the output is a clustered graph or subgraph (see Non Patent Literature 3). However, when the graph clustering method is applied to all workflows (for example, a spaghetti process), the workflow execution information (which is also an ordered task list) is not kept. Therefore, there is a problem in that the graph clustering method cannot be applied to the workflow execution information.

Therefore, the present invention has an object to provide a technique for automatically determining the condition (including the threshold value of the KPI) of the category division of the KPI that is necessary for narrowing down the information of the workflow to be extracted from logs.

The present invention provides a technique for determining the condition of the category division of a key performance indicator (KPI) from multiple pieces of workflow execution information. The technique can include a method for determining the condition of the category division of the KPI from multiple pieces of workflow execution information, and a computer, computer program, and computer program product therefor.

FIG. 1A is a diagram showing an example of a computer that can be used in an embodiment of the present invention, or a computer according to the embodiment of the present invention. The computer (101) can be, for example, a single or multiple computers, or for example, a single or multiple server computers (for example, they only need to be computers having a server function), but is not limited to these.

The computer (101) includes a single or multiple CPUs (102) and a main memory (103), and they are connected with a bus (104). The CPU (102), for example, is based on a 32-bit or 64-bit architecture. The CPU (102) can be Power™ series of International Business Machines Corporation, Xeon® series, Core™ i series, Core™ 2 series, Pentium® series, Celeron® series, or Atom™ series of Intel Corporation, or Opteron™ series, A series, Phenom™ series, Athlon™ series, Turion® series, or Sempron™ of AMD (Advanced Micro Devices) Inc., for example.

With the bus (104), a display (106), for example, a liquid crystal display (LCD), can be connected through a display controller (105). Further, the liquid crystal display (LCD) may be, for example, a touch panel display or a floating touch display. The display (106) can be used for displaying, as appropriate graphic interfaces, objects that are displayed by the operation of the running software (for example, a computer program according to the embodiment of the present invention, or various arbitrary running computer programs (for example, a program for actualizing a virtual environment) on the computer (101)) on the computer (101). Further, the display (106), for example, can output a KPI list, workflow execution information, a workflow graph, a graph edit distance table, or the condition of the category division that can be used in the embodiment of the present invention.

With the bus (104), a disk (108), for example, a hard disk or a solid-state drive (SSD), can be arbitrarily connected, for example, through an SATA or IDE controller (107). With the bus (104), a drive (109), for example, a CD, DVD or BD drive, can be arbitrarily connected, for example, through the SATA or IDE controller (107). With the bus (104), a keyboard (111) and a mouse (112) can be arbitrarily connected, through a peripheral device controller (110), for example, through a keyboard/mouse controller or a USB bus.

In the disk (108), an operating system such as, for example, an operating system developed for a mainframe (for example, z/OS, z/VM or z/VSE), Windows®, UNIX®, Linux®, MacOS®, and Android®, a Java® processing environment such as J2EE, Java® applications, a Java® virtual machine (VM), a program to provide a Java® just-in-time (JIT) compiler, the computer program according to the embodiment of the present invention, and other various arbitrary computer programs, as well as data, can be stored so as to be capable of being loaded in the main memory (103).

Further, in the disk (108), for example, a computer program according to the third embodiment of the present invention can be stored so as to be capable of being loaded in the main memory (103). The disk (108) may be embedded in the computer (101), may be connected through a cable such that the computer (101) can access it, or may be connected through a wired or wireless network such that the computer (101) can access it. The drive (109), as necessary, can be used for installing programs, for example, an operating system, application programs or the computer program according to the embodiment of the present invention, from a CD-ROM, a DVD-ROM or a BD to the disk (108).

A communication interface (114) is in accordance with the Ethernet® protocol, for example. The communication interface (114) is connected with the bus (104) through a communication controller (113), plays a role in connecting the computer (101) with a communication line (115) by wire or wireless, and provides the network interface layer for the TCP/IP communication protocol of the communication function of the operating system of the computer (101). Here, the communication line can be, for example, in a wireless LAN environment based on a wireless LAN connection standard, a Wi-Fi wireless LAN environment such as IEEE802.11a/b/g/n, or a mobile telephone network environment (for example, a 3G, LTE or 4G environment).

FIG. 1B is a diagram showing an example of a computer that can be used in an embodiment of the present invention, or a computer according to the embodiment of the present invention, and showing the case where a single or multiple virtual machines operate on the computer. The computer (121) can be configured as a computer device such as a workstation, a rack-mountable server, a blade server, a midrange, and a mainframe, for example.

The computer (121) shown in FIG. 1B can include, as a hardware resource (122), a single or multiple CPUs (131), a main memory (132), a storage (133), a communication controller (134), and a communication interface (135). The single or multiple CPUs (131), the main memory (132), the storage (133), the communication controller (134), the communication interface (135), and a communication line (136) can correspond to the single or multiple CPUs (102), the main memory (103), the disk (108), the communication controller (113), the communication interface (114), and the communication line (115) of the computer (101) shown in FIG. 1A, respectively.

Further, the computer (121) operates as a physical host machine, and can make a single or multiple virtual machines 1 to n (125-1 to 125-2) (also called Domains U or child partitions) that have, as guest OSes (156), identical or different OSes (for example, Windows®, UNIX®, Linux®) operate on a hypervisor (also called a virtualized monitor or a virtualized OS) (123) of virtualized software (for example, VMWare®, Hyper-V®, Xen®).

Further, the computer (121) can make a management virtual machine (124) (also called a Domain 0 or a parent partition) operate on the above hypervisor (123). The management virtual machine (124) includes a management OS (141), a control module (142) to operate on the management OS (141), and a virtual resource (143). The control module (142) is a module that issues commands to the hypervisor (123). Further, the control module (142) issues, to the hypervisor (123), the instruction of the creation of the virtual machines 1 to n (125-1 to 125-2) in a user domain, and the instruction of the activation of the guest OS (156), and controls the operation of the virtual machines 1 to n (125-1 to 125-2). The virtual resource (143) is the hardware resource (122) allocated for the management virtual machine (124).

The virtual machines 1 to n (125-1 to 125-2) includes a virtual resource, the guest OS (156), and various applications 1 to n (157-1 to 157-3) to operate on the guest OS (156). The virtual resource includes, for example, a virtual CPU (151), a virtual memory (152), a virtual disk (153), a virtual communication controller (154), and a virtual communication interface (155). It should be understood that when the computer (101) is described hereinafter, the computer (121) shown in FIG. 1B may be adopted instead of the computer (101) shown in FIG. 1A.

The flowcharts shown in FIG. 2A to FIG. 2D show flowcharts for the process of determining the condition of the category division of a key performance indicator (KPI) from multiple pieces of workflow execution information according to an embodiment of the present invention.

In the following, the flowcharts shown in FIG. 2A to FIG. 2D respectively will be described with reference to FIG. 3A to FIG. 3D, FIG. 4 and FIG. 5. FIG. 3A shows an example of a KPI list that can be used in the embodiment of the present invention. FIG. 3B shows an example of the workflow execution information that can be used in the embodiment of the present invention. FIG. 3C shows a workflow graph that can be generated in the embodiment of the present invention. FIG. 3D shows an example of the conditions of the regions of workflow graphs that can be saved in the embodiment of the present invention. FIG. 4 shows an example of a graph edit distance table that can be created in the embodiment of the present invention. FIG. 5 shows an example in which the graph edit distance table is updated, in the embodiment of the present invention.

FIG. 2A shows a flowchart of the whole of the process of determining the condition of the category division of the key performance indicator (KPI) from multiple pieces of workflow execution information according to the embodiment of the present invention. In step 201, the computer (101) starts the process of determining the condition of the category division of the KPI. In step 202, the computer (101) acquires a KPI list, for example, from a storage medium in which the KPI list is stored. The KPI list has at least one set that includes the type m of a certain KPI and a division number K associated with the type m. The division number K is the division number of multiple pieces of workflow execution information p (total number n) for the type m of the certain KPI.

FIG. 3A shows an example of the KPI list. A KPI list (301) has multiple sets each of which includes the type m for the workflow and the division number K associated with the type m. The type m of the KPI is not particularly limited if it is a matter relevant to a business that is the object of the KPI. For example, types relevant to all businesses having the software to generate the workflow execution information, as exemplified by the financial field (for example, insurance product names, financial product names), the industrial field (for example, automobile part names), and the software field (for example, program file names, or developed outcome names such as documents), are included.

The type m of the KPI can be classified into, for example, numeric data (also called quantitative data) or category data (also called qualitative data), in accordance with the measurement level in a statistical method. However, in the embodiment of the present invention, in the case where it is unknown whether it is numeric data or category data, the numeric data can be judged depending on whether it is sortable. In the case of being sortable, the data is numeric data, and unsortable data can be category data.

When the type m of the KPI is numeric data, it can be, for example, the processing time of the workflow, the number of times of viewing of a particular page during the workflow execution, the time spent from a particular task to a particular task during the workflow execution, the rate of the time spent on a particular task process relative to the workflow execution time, or the date (see the KPI list (301) in FIG. 3A), but is not limited to these.

When the type m of the KPI is category data, it can be, for example, the workflow start condition, the attribute (product name) relevant to the workflow execution, or the attribute (for example, the position or the like) relevant to the workflow executioner (see the KPI list (301) in FIG. 3A), but is not limited to these. The division number K may be previously given in the KPI list, or may be calculated by a method shown below.

In the case where the type m of the KPI is numeric data, the division number K can be automatically calculated using a statistical method, for example, using the Sturges' formula, the Scott's choice, the square-root choice, the Freedman-Diaconis' choice, or the choice based on the minimization in the L2 risk function estimation. As for the division number K, in the case where the type m of the KPI is numeric data (for example, workflow execution time), the division number K associated with the type m can be set, for example, by the division into 10 with respect to the execution time.

In the case where the type m of the KPI is category data, the division number K can be the category number for the type m, or a value associated with the type m. The category number for the type m can be determined from the number of categories, for example. For example, in the case where the workflow start condition is shown as Yes or No, the category number is 2. Therefore, the division number can be determined as 2. Further, the value associated with the type m, for example, is the attribute relevant to the workflow executioner, and can be the position, for example.

Further, in step 202, the computer (101) acquires the multiple pieces of workflow execution information p (total number n), for example, from a storage medium in which the multiple pieces of workflow execution information p are stored. FIG. 3B shows an example of the workflow execution information p. Here, it should be noted that, in the code shown in FIG. 3B, the numerals (01 to 33) shown on the left side of the code are line numbers assigned for facilitating the explanation and are not necessary for describing the code. Here, as for the acquisition of the KPI list and the acquisition of the multiple pieces of workflow execution information p, it does not matter which is acquired first, or they may be acquired simultaneously.

The workflow execution information (311) shown in FIG. 3B is described on an XML basis, and has two process instances (ProcessInstance id="0") (line 04 to line 17, 321) and (ProcessInstance id="4") (line 18 to line 31, 322). The process instance (ProcessInstance id="0") (321) has three sets: a set (line 05) of the type m (DURATION) of the KPI and the value (314001) of the KPI, a set (line 06) of the type m (START_TYPE) of the KPI and the value (new) of the KPI, and a set (line 07) of the type m (HELP_PAGE_ACCESS) of the KPI and the value (0) of the KPI. The process instance (ProcessInstance id="4") (322) has three sets: a set (line 19) of the type m (DURATION) of the KPI and the value (363491) of the KPI, a set (line 20) of the type m (START_TYPE) of the KPI and the value (update) of the KPI, and a set (line 21) of the type m (HELP_PAGE_ACCESS) of the KPI and the value (1) of the KPI.

Thus, the workflow execution information p has a single or multiple process instances, and each process instance can have a single or multiple sets of the type m of the KPI and the value associated with the type m. In step 203, the computer (101) starts the process of executing steps 204 to 208 shown below, for each of all types m of the KPI in the KPI list. In step 204, the computer (101) acquires one of the types m of the KPI from the KPI list. This is for deciding the condition of the category division for each type m of the KPI. In step 205, the computer (101) divides the multiple pieces of workflow execution information p into K pieces, generates workflow graphs G_k from the K pieces of workflow execution information p after the division, and saves the conditions of the regions of the workflow graphs G_k. The detail of the process in step 205 will be described in detail below, in accordance with the flowchart shown in FIG. 2B.

In step 206, the computer (101) calculates graph edit distances d for the respective workflow graphs G_k generated in step 205. The detail of the process in step 206 will be described in detail below, in accordance with the flowchart shown in FIG. 2C. In step 207, the computer (101), of the graph edit distances d calculated in step 206, merges two workflow graphs that have the shortest graph edit distance d, and generates a new workflow graph group. The detail of the process in step 207 will be described in detail below, in accordance with the flowchart shown in FIG. 2D. In step 208, the computer (101) determines values to define the new group, as the condition of the category division.

In the case where the type m of the KPI is numeric data, the above value to define the new group is a value in the range from the minimum value to the maximum value of the numeric data (which is also the threshold value). The computer (101) determines the above value in the numeric data, as the above condition of the category division. In the case where the type m of the KPI is category data, the above value to define the new group is the name of a category to define the above new group (it can be the name of a category after the merging that is arbitrarily given). The computer (101) determines the name of the category, as the above condition of the category division. In the above way, the computer (101) can automatically determine the conditions (including the threshold values of the KPI) of the category divisions in the filtering of logs. In step 209, the computer (101) finishes the process of determining the conditions of the category divisions of the KPI.

FIG. 2B is a flowchart showing the detail of the process shown in step 205 in the flowchart shown in FIG. 2A. In step 211, the computer (101) starts the process of dividing the multiple pieces of workflow execution information p into K pieces, generating the workflow graphs G_k from the K pieces of workflow execution information p after the division, and saving the condition of the regions of the workflow graphs G_k.

In step 212, the computer (101) judges whether the type m of the KPI acquired in step 204 is numeric data. The computer (101) advances the process to step 213, in response that the type m of the KPI is numeric data. On the other hand, the computer (101) advances the process to step 215, in response that the type m of the KPI is not numeric data (that is, it is category data). In step 213, in response that the type m of the KPI is numeric data, the computer (101) sorts the multiple pieces of workflow execution information p (total number n) based on the value x of the type m.

In step 214, the computer (101) divides all pieces of workflow execution information p after the sort in step 213, into K pieces (K<n), and defines them as groups k (k is the index of the group). In step 215, in response that the type m of the KPI is not numeric data (that is, it is category data), the computer (101) divides all pieces of workflow execution information p (total number n) into K pieces based on the value x of the type m, and defines them as groups k (k is the index of the group). The division number K in this case corresponds to the number of the types m of the value x of the KPI.

In step 216, the computer (101) initializes k. In step 217, the computer (101) judges whether k<K (division number) holds. The computer (101) advances the process to step 218, in response that k<K holds. On the other hand, the computer (101) advances the process to a finish step 221, in response that k<K does not hold (K<k holds).

In step 218, the computer (101) generates the workflow graphs G_k from the multiple pieces of workflow execution information p (total number n) belonging to the groups k, using αalgorithm (or alpha miner), Heuristic miner, Genetic miner, Fuzzy miner, Transition system miner, Transition system to petri net, Declare miner, ILP miner, Simple log filter, Dotted chart analysis, Trace alignment, Guidetree miner, Social network miner, LTL checker, Fitness, ETConformance, Reply log on flexible model, PomPom, or Transition system analyzer, for example. Whenever going through step 218 once, one workflow graph G_k is generated.

FIG. 3C shows an example of the workflow graphs G_k generated in step 218. The example shown in FIG. 3C is an example of the workflow graphs G_k in the case where the type m of the KPI is numeric data and all pieces of workflow execution information p are divided into K pieces after the multiple pieces of workflow execution information p (total number n) are sorted based on the value x of the type m.

FIG. 3C shows that workflow graphs G_k (G0 (351), G1 (352), . . . , and Gk-1 (353)) are generated from multiple pieces of workflow execution information (sorted in an execution order) respectively belonging to the regions (341, 342, . . . , and 343) after the division. Each of v0 to vn-1 represents the processing time of the workflow. Each of ρ0 to ρn-1 represents the workflow execution information. In step 219, the computer (101) saves the conditions of the workflow graphs G_k.

FIG. 3D shows an example of the conditions of the workflow graphs G_k saved in step 219. FIG. 3D shows the respective conditions of the workflow graphs G0 (371), G1 (372), G2 (373), . . . , and Gk-1 (374). Whenever going through step 219 once, one of the conditions of the workflow graphs G_k is saved. In step 220, the computer (101) increments k by 1. Then, the computer (101) returns the process to step 217, and repeats steps 217 to 220. In step 221, the computer (101) finishes the process of dividing the multiple pieces of workflow execution information p into K pieces, generating the workflow graphs G_k from the K pieces of workflow execution information after the division, and saving the conditions of the regions of the workflow graphs G_k.

FIG. 2C is a flowchart showing the detail of the process shown in step 206 in the flowchart shown in FIG. 2A. In step 231, the computer (101) starts the process of calculating the graph edit distances d for the respective workflow graphs G_k. In step 232, the computer (101) creates a graph edit distance table (K rows×K columns) for storing the graph edit distances d.

FIG. 4 shows an example of the graph edit distance table (K rows ×K columns) generated in step 232. The example shown in FIG. 4 is a graph edit distance table (401) of Ga (K rows)×Gb (K columns). Here, of the table entries in the graph edit distance table (401), only the upper triangular region (or the lower triangular region), that is, only (K×K−K)/2 spots have values (the graph edit distances d).

In step 233, the computer (101) initializes a row index a of the graph edit distance table. In step 234, the computer (101) assigns a+1 to a column index b of the graph edit distance table. This is because the graph edit distance is unnecessary in the case of Ga=Gb. In step 235, the computer (101) acquires two workflow graphs G_a and G_b from the workflow graphs G_k generated in step 205. In step 236, the computer (101) calculates a graph edit distance d(a, b) between the workflow graph G_a and the workflow graphs G_b. In step 237, the computer (101) saves the graph edit distance d(a, b) in the row a and column b of the graph edit distance table (401). Whenever going through step 237 once, the graph edit distance d(a, b) is saved in one of the table entries of the graph edit distance table (401). In step 238, the computer (101) judges whether b<K (division number) holds. The computer (101) advances the process to step 239, in response that b<K holds. On the other hand, the computer (101) advances the process to step 240, in response that b<K does not hold (K<b holds). In step 239, in response that b<K holds, the computer (101) assigns a+1 to the row index a of the graph edit distance table. This is for calculating the graph edit distances on the next row. In step 240, in response that K<b holds, the computer (101) assigns b+1 to the column index b of the graph edit distance table. This is for calculating the graph edit distance on the next column. Then, the computer (101) returns the process to step 235.

In step 241, the computer (101) judges whether a<K (division number) holds. The computer (101) advances the process to a finish step 242, in response that a<K holds. On the other hand, in response that a<K does not holds (K<a holds), the computer (101) returns the process to step 234. In step 242, the computer (101) finishes the process of calculating the graph edit distances d for the respective workflow graphs G_k.

FIG. 4 shows an example of the graph edit distance table at the finish time of the process of calculating the graph edit distances d in step 242. In a graph edit distance table (402), the graph edit distances d are saved in the table entries on the upper triangular region.

FIG. 2D is a flowchart showing the detail of the process shown in step 207 in the flowchart shown in FIG. 2A. In step 251, the computer (101) starts the process of merging the two workflow graphs that have the shortest graph edit distance d, and generating the new group. In step 252, the computer (101) arbitrarily sorts the edit distances d saved in the graph edit distance table, in ascending order. In step 253, the computer (101) acquires two workflow graphs G_a and G_b that have the shortest graph edit distance d. For example, in the graph edit distance table (402) shown in FIG. 5, the graph edit distance between the workflow graph G0 and the workflow graph G2 is 0 (that is, the forms of the graphs are the same), and therefore, the graph edit distance between the workflow graph G0 and the workflow graph G2 is the shortest graph edit distance.

In step 254, the computer (101) judges whether d<D holds. D is a threshold value of the graph edit distance, and can be previously set to an arbitrary numeric value. For example, D is 0.3. The computer (101) advances the process to step 255, in response that d<D holds. That is, the computer (101) repeats the processes of steps 255 to 258 until it becomes the fixed distance D. On the other hand, the computer (101) advances the process to a finish step 259, in response that d<D does not hold (D<d holds). In step 255, the computer (101) generates a new workflow graph G_ab from the workflow execution information belonging to the workflow graph G_a and the workflow execution information belonging to the workflow graph G_b. In step 256, the computer (101) deletes, from the graph edit distance table, the rows and columns (that is, the row a, column a, row b, and column b) of the workflow graph G_a and workflow graph G_b that are the generation source of the new workflow graph G_ab, and updates the graph edit distance table.

FIG. 5 shows an example of the graph edit distance table in which the rows and columns of the workflow graph G_a and workflow graph G_b have been deleted in step 256. In a graph edit distance table (501) shown in FIG. 5, the respective rows and columns of the workflow graph G0 and workflow graph G2, which have the shortest graph edit distance, have been deleted from the graph edit distance table (401). In step 257, the computer (101) adds the row and column for the new workflow graph G_ab, in the graph edit distance table.

FIG. 5 shows an example of the graph edit distance table in which the row and column for the new workflow graph G_ab have been added in step 257. In a graph edit distance table (502) shown in FIG. 5, the row and column for a new workflow graph (G0, G2) have been added in the graph edit distance table (501). In step 258, the computer (101) calculates the graph edit distances on the row and column for the new workflow graph Gab, adds the calculated graph edit distances in the graph edit distance table, and updates the graph edit distance table. In the graph edit distance table (502) shown in FIG. 5, the graph edit distances in the filled table entries (512) are calculated. In step 259, the computer (101) finishes the process of merging the two workflow graphs that have the shortest graph edit distance d, and generating the new group.

FIG. 6 is a diagram showing an example of a functional block diagram of a computer that preferably include the hardware configuration according to FIG. 1A or FIG. 1B and that implements the embodiment of the present invention according to the flowcharts shown in FIG. 2A to FIG. 2D respectively.

A computer (601) includes, for example, the configuration shown in the computer (101) shown in FIG. 1A, and for example, includes the CPU (102), the main memory (103), and the disk (108). The computer (601) includes division means (611), graph generation means (612), graph edit distance calculation means (613), and graph merging means (614). In addition, the computer (601), arbitrarily, may further include category-division condition calculation means (615). Moreover, the computer (601), arbitrarily, may further include division-number determination means (616).

The division means (611) acquires the KPI list from a recording medium (691) in which the KPI list is stored, acquires the multiple pieces of workflow execution information from a recording medium (692) in which the multiple pieces of workflow execution information are stored, and divides the acquired multiple pieces of workflow execution information into the division number for the type of the KPI.

Further, in response that the type of the KPI is numeric data, the division means (611) can sort the above multiple pieces of workflow execution information, based on the above value associated with the above type, and can divide the above multiple pieces of workflow execution information after the above sort, into the above division number. Further, the division means (611) can execute step 204 and the process of dividing the multiple pieces of workflow execution information p in step 205 described in FIG. 2A, and steps 212 to 215 described in FIG. 2B.

The graph generation means (612) generates the workflow graph for each of the multiple groups after the division into the division number for the type of the KPI, from the workflow execution information belonging to the group. Further, the graph generation means (612) can store the generated workflow graphs in a storage medium (693) for storing the workflow graphs. Further, the graph generation means (612) can save the conditions of the regions of the generated workflow graphs. Further, the graph generation means (612) can execute the process of generating the workflow graphs G_k in step 205 described in FIG. 2A, and steps 216 to 220 described in FIG. 2B. The graph edit distance calculation means (613) calculates the graph edit distances for the respective two arbitrary workflow graphs that are generated by the graph generation means (612).

Further, the graph edit distance calculation means (613) can calculate the graph edit distances between the new group generated by the graph merging means (614) and the other workflow graphs. Further, the graph edit distance calculation means (613) can execute the processes of: (c-1) acquiring a combination of two arbitrary workflow graphs; (c-2) calculating the graph edit distance for the combination of the two arbitrary workflow graphs; and (c-3) repeating the process (c-1) and the process (c-2) for the remaining combinations of the two arbitrary workflow graphs.

Further, the graph edit distance calculation means (613) can record the above calculated graph edit distances in a storage medium (694) in which the graph edit distance table is stored. Further, for the table in which the new group has been added by the graph merging means (614), the graph edit distance calculation means (613) can record the graph edit distances calculated for the above new group, in the graph edit distance table. Further, the graph edit distance calculation means (613) can execute step 206 described in FIG. 2A and all steps shown in FIG. 2C.

The graph merging means (614) merges the two workflow graphs that are shortest in the graph edit distance calculated by the graph edit distance calculation means (613), and generates the new group. Further, the graph merging means (614) can generate the above new group from multiple pieces of workflow execution information respectively belonging to the above two workflow graphs that are shortest in the above graph edit distance.

Further, the graph merging means (614) can merge the respective regions of the two groups that are shortest in the above graph edit distance, and can save the condition of the region of the above new group. Further, the graph merging means (614) can add the above generated new group in the graph edit distance table. Further, the graph merging means (614) can delete, from the graph edit distance table, the two workflow graphs belonging to the two groups that are shortest in the graph edit distance. Further, the graph merging means (614) can execute step 207 described in FIG. 2A and all steps described FIG. 2D.

The category-division condition calculation means (615) determines the value to define the above new group, as the condition of the above category division. Further, in the case where the type of the above KPI is numeric data, the category-division condition calculation means (615) can determine the value of the above numeric data, as the condition of the above category division. Further, in the case where the type of the above KPI is category data, the category-division condition calculation means (615) can determine the name of the category, as the condition of the above category division.

Further, the category-division condition calculation means (615) can execute step 208 described in FIG. 2A. The division-number determination means (616) acquires the KPI list from the recording medium (691) in which the KPI list is stored, and determines the division number for the type of the KPI. Further, in response that the type of the KPI is numeric data, the division-number determination means (616) can determine the above division number using a statistical method. Further, in response that the type of the KPI is category data, the division-number determination means (616) can determine the above division number from the above category number for the type or the above value associated with the type.

What process users perform depending on the access times to a help page on a web page was examined by the execution of the process according to the embodiment of the present invention. As a result, it was determined that the access times as the condition of the category division were two. It was found that users viewed the help page without following operation guidance on the help page in the case where the access times are two or less, and on the other hand, users viewed the help page following the operation guidance on the help page in the case where the access times are more than two.

According to conventional methods, it is necessary to examine the access times to the help page from zero one by one, by trial and error, and synthesize workflows. However, by the execution of the process according to the embodiment of the present invention, it is possible to automatically detect the threshold value of the KPI (the access times are 2 or less, or more than this). Therefore, according to the embodiment of the present invention, it is possible to save the effort of searching the threshold value of the KPI by trial and error in conventional methods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for determining a condition of category division of a key performance indicator (hereinafter, referred to as a KPI) from multiple pieces of workflow execution information, each of the multiple pieces of workflow execution information having at least one set of a type of the KPI and a value associated with the type, the computer system comprising:
   a memory; and
   a processor in communication with the memory, wherein the processor is configured to:
      divide the multiple pieces of workflow execution information into a division number for the type of the KPI wherein the multiple pieces of workflow execution information belong to multiple groups associated with the type of KPI;
      generate a graph for each of the multiple groups after the division into the division number, from workflow execution information belonging to the multiple groups;
      calculate graph edit distances for any two graphs;
      generate a new group by merging two graphs having the shortest graph edit distance;
      calculate a graph edit distance between the new group and another graph;
      repeat the generation of the new group and the calculation of the graph edit distance between the new group and another graph until the graph edit distance is more than a certain fixed edit distance;
      determine, in response to the graph edit distance for the new group being more than the certain fixed edit distance, a threshold value, wherein the threshold value defines the new group as the condition of the category division;
      displaying the new group and the threshold value to a user;
      accessing, by the user, a help page on a webpage;
      identifying, by the processor, that the help page is associated with workflow execution information relating to the new group associated with the type of KPI;
      automatically detecting a threshold value for the type of KPI in response to identifying the help page being associated with workflow execution information relating to the new group associated with the type of KPI; and
      displaying the help page to the user in response to determining that the type of KPI is above the threshold value.

2. The computer system of claim 1, wherein the condition of the category division is determined for each type of the KPI.

3. The computer system of claim 1, wherein the type of the KPI is numeric data and the threshold value to define the new group is a value in a range from a minimum value to a maximum value of the numeric data.

4. The computer system of claim 1, wherein the type of the KPI is category data and the threshold value to define the new group is a name of a category to define the new group.

5. The computer system of claim 1, wherein the processor is further configured to:
   determine the division number for the type of the KPI.

6. The computer system of claim 5, wherein determining the division number for the type of the KPI includes determining the division number using a statistical method in response to the type of the KPI being numeric data.

7. The computer system of claim 5, wherein determining the division number for the type of the KPI includes determining the division number from a category number for the type or the value associated with the type in response to the type of the KPI being category data.

8. The computer system of claim 1, wherein dividing the multiple pieces of workflow execution information into the division number for the type of the KPI further includes:
   sorting the multiple pieces of workflow execution information based on the value associated with the type, in response to the type of the KPI being numeric data, and
   dividing the multiple pieces of workflow execution information after the sort into the division number.

9. The computer system of claim 1, wherein generating the graph for each of the multiple groups further includes saving a condition of a region of each of the generated graphs.

10. The computer system of claim 1, wherein calculating the graph edit distances for the any two graphs further includes:

acquiring a combination of two graphs;

calculating the graph edit distance for the combination of two graphs; and repeating the calculating for all remaining combinations of two graphs.

11. The computer system of claim 1, wherein generating the new group further includes generating the new group from the multiple pieces of workflow execution information respectively belonging to the two graphs having the shortest graph edit distance.

12. The computer system of claim 1, wherein generating the new group further includes merging respective regions of the two groups having the shortest graph edit distance and saving a condition of a region of the new group.

13. The computer system of claim 1, wherein calculating the graph edit distances for the any two graphs further includes recording the calculated graph edit distances in a table.

14. The computer system of claim 13, wherein generating the new group further includes adding the generated new group to the table.

15. The computer system of claim 14, wherein generating the new group further includes deleting, from the table, two graphs belonging to two groups having the shortest graph edit distance.

16. The computer system of claim 15, wherein calculating the graph edit distance for the new group further includes recording, in the table after the addition of the new group, the graph edit distance calculated for the new group.

17. The computer system of claim 14, wherein repeating the generation of the new group and the calculation of the graph edit distance between the new group and another graph until the graph edit distance is more than a certain fixed edit distance includes repeating the generation of the new group and the calculation of the graph edit distance between the new group and another graph until table entries of the table have an edit distance more than the certain fixed edit distance.

18. The computer system of claim 14, wherein the table is a table that includes a number of rows and a number of columns, wherein the number of rows and the number of columns is the same.

19. The computer system of claim 18, wherein the graph edit distance is half of the number of rows multiplied by the number of columns subtracted by the number of rows, and wherein cells in the table associated with the graph edit distance are the only cells to have values.

* * * * *